US005596873A

United States Patent [19]

Joshi et al.

[11] Patent Number: 5,596,873

[45] Date of Patent: Jan. 28, 1997

[54] GAS TURBINE COMBUSTOR WITH A PLURALITY OF CIRCUMFERENTIALLY SPACED PRE-MIXERS

[75] Inventors: Narendra D. Joshi; John M. Koshoffer, both of Cincinnati, Ohio

[73] Assignee: General Electric Company, Cincinnati, Ohio

[21] Appl. No.: 305,629

[22] Filed: Sep. 14, 1994

[51] Int. Cl.$^6$ .................................................. F02C 7/08

[52] U.S. Cl. ............................................ 60/738; 60/746

[58] Field of Search ........................... 60/737, 738, 740, 60/746, 733, 747, 748

[56] References Cited

U.S. PATENT DOCUMENTS

| | | | |
|---|---|---|---|
| 3,452,933 | 7/1969 | Hakluytt | 239/434 |
| 4,215,535 | 8/1980 | Lewis | 60/736 |
| 4,222,232 | 9/1980 | Robinson | 60/737 |
| 4,827,724 | 5/1989 | Maghon et al. | 60/737 |
| 5,070,700 | 12/1991 | Mowill | 60/746 |
| 5,156,002 | 10/1992 | Mowill | 60/738 |
| 5,165,241 | 11/1992 | Joshi et al. | 60/737 |
| 5,218,824 | 6/1993 | Cederwall et al. | 60/740 |
| 5,251,447 | 10/1993 | Joshi et al. | 60/737 |

*Primary Examiner*—Timothy S. Thorpe
*Attorney, Agent, or Firm*—Andrew C. Hess; Wayne O. Traynham

[57] ABSTRACT

An annular combustor with an air fuel mixer is disclosed including a plurality of mixing tubes having a forward end and an exit end, wherein a longitudinal axis through the exit end for each mixing tube is at both an axial angle and a radial angle to the centerline axis of the mixer. A fuel injector for providing fuel to the forward end of each mixing tube, a fuel manifold in flow communication with each of the fuel injectors, and a fuel supply and control means are provided. High pressure air from a compressor is injected into the mixing tubes and fuel is injected into the mixing tubes from the fuel injectors, wherein the high pressure air and the fuel is uniformly mixed therein so as to produce minimal formation of pollutants when the fuel/air mixture is exhausted out the downstream end of the mixing tubes into the combustor and combusted. The mixing tubes preferably impart a swirl to the fuel/air mixture as it exits into the combustor.

21 Claims, 6 Drawing Sheets

GAS TURBINE COMBUSTOR WITH A PLURALITY OF CIRCUMFERENTIALLY SPACED PRE-MIXERS

BACKGROUND OF THE INVENTION

1. Field of the Invention

The present invention relates to an air fuel mixer for the combustor of a gas turbine engine, and, more particularly, to an air fuel mixer for the combustor of a gas turbine engine which uniformly mixes fuel and air so as to reduce NOx formed by the combustion of the fuel/air mixture.

2. Description of Related Art

Air pollution concerns worldwide have led to stricter emissions standards requiring significant reductions in gas turbine pollutant emissions, especially for industrial and power generation applications. Nitrous Oxide (NOx), which is a precursor to atmospheric pollution, is generally formed in the high temperature regions of the gas turbine combustor by direct oxidation of atmospheric nitrogen with oxygen. Reductions in gas turbine emissions of NOx have been obtained by the reduction of flame temperatures in the combustor, such as through the injection of high purity water or steam in the combustor. Additionally, exhaust gas emissions have been reduced through measures such as selective catalytic reduction. While both the wet techniques (water/steam injection) and selective catalytic reduction have proven themselves in the field, both of these techniques require extensive use of ancillary equipment. Obviously, this drives the cost of energy production higher. Other techniques for the reduction of gas turbine emissions include "rich burn, quick quench, lean burn" and "lean premix" combustion, where the fuel is burned at a lower temperature.

In a typical aero-derivative industrial gas turbine engine, fuel is burned in an annular combustor. The fuel is metered and injected into the combustor by means of multiple nozzles into a venturi along with combustion air having a designated amount of swirl. No particular care has been exercised in the prior art, however, in the design of the nozzle, the venturi or the dome end of the combustor to mix the fuel and air uniformly to reduce the flame temperatures. Accordingly, non-uniformity of the air/fuel mixture causes the flame to be locally hotter, leading to significantly enhanced production of NOx.

In the typical aircraft gas turbine engine, flame stability and variable cycle operation of the engine dominate combustor design requirements. This has, in general, resulted in combustor designs with the combustion at the dome end of the combustor proceeding at the highest possible temperatures at stoichiometric conditions. This, in turn, leads to large quantities of NOx being formed in such gas turbine combustors since it has been of secondary importance.

While premixing ducts in the prior art have been utilized in lean burning designs, they have been found to be unsatisfactory due to flashback and auto-ignition considerations for modern gas turbine applications. Flashback involves the flame of the combustor being drawn back into the mixing section, which is most often caused by a backflow from the combustor due to compressor instability and transient flows. Auto-ignition of the fuel/air mixture can occur within the premixing duct if the velocity of the air flow is not fast enough, i.e., if a significant portion of the residence time distribution of the premixer is above a critical value based on chemical kinetics. Flashback and auto-ignition have become serious considerations in the design of mixers for aero-derivative engines due to increased pressure ratios and operating temperatures.

Other air fuel mixers for gas turbine combustors to provide uniform mixing are disclosed in U.S. Pat. Nos. 5,165,241 and 5,251,447, which are owned by the assignee of the current invention. These air fuel mixers include a mixing duct, a set of inner and outer annular counter-rotating swirlers at the upstream end of the mixing duct, a centerbody, and separate manners of injecting fuel into the mixing duct wherein high pressure air from a compressor is injected into the mixing duct through the swirlers to form an intense shear region for mixing fuel injected into the mixing duct. By contrast, the present invention is principally intended for use in an aeronautical gas turbine engine and provides an air fuel mixer which maximizes mixing without a set of counter-rotating swirlers or a centerbody. However, the air fuel mixer of the present invention could be employed in industrial and other gas turbine engines by suitably modifying design parameters without departing from the scope of the invention.

Accordingly, a primary objective of the present invention is to provide an air fuel mixer for an aeronautical gas turbine engine which avoids the problems of auto-ignition and flashback.

Another objective of the present invention is to provide an air fuel mixer which more uniformly mixes fuel and air without incurring backflow from the combustor.

Yet another objective of the present invention is to provide an air fuel mixer which supplies a significant swirl to the fuel/air mixture so as to generate an adverse pressure gradient in the combustion zone, thereby causing a central recirculation zone which stabilizes the flames.

These objectives and other features of the present invention will become more readily apparent upon reference to the following description when taken in conjunction with the following drawing.

SUMMARY OF THE INVENTION

In accordance with one aspect of the present invention, an air fuel mixer is disclosed including a plurality of mixing tubes having a forward end and an exit end, wherein a longitudinal axis through the exit end for each mixing tube is at both an axial angle and a radial angle to the centerline axis of the mixer. A fuel injector for providing fuel to the forward end of each mixing tube, a fuel manifold in flow communication with each of the fuel injectors, and a fuel supply and control means are also provided. High pressure air from a compressor is injected into the mixing tubes and fuel is injected into the mixing tubes from the fuel injectors, wherein the high pressure air and the fuel is uniformly mixed therein so as to produce minimal formation of pollutants when the fuel/air mixture is exhausted out the downstream end of the mixing tubes into the combustor and combusted. The mixing tubes preferably impart a swirl to the fuel/air mixture as it exits into the combustor.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
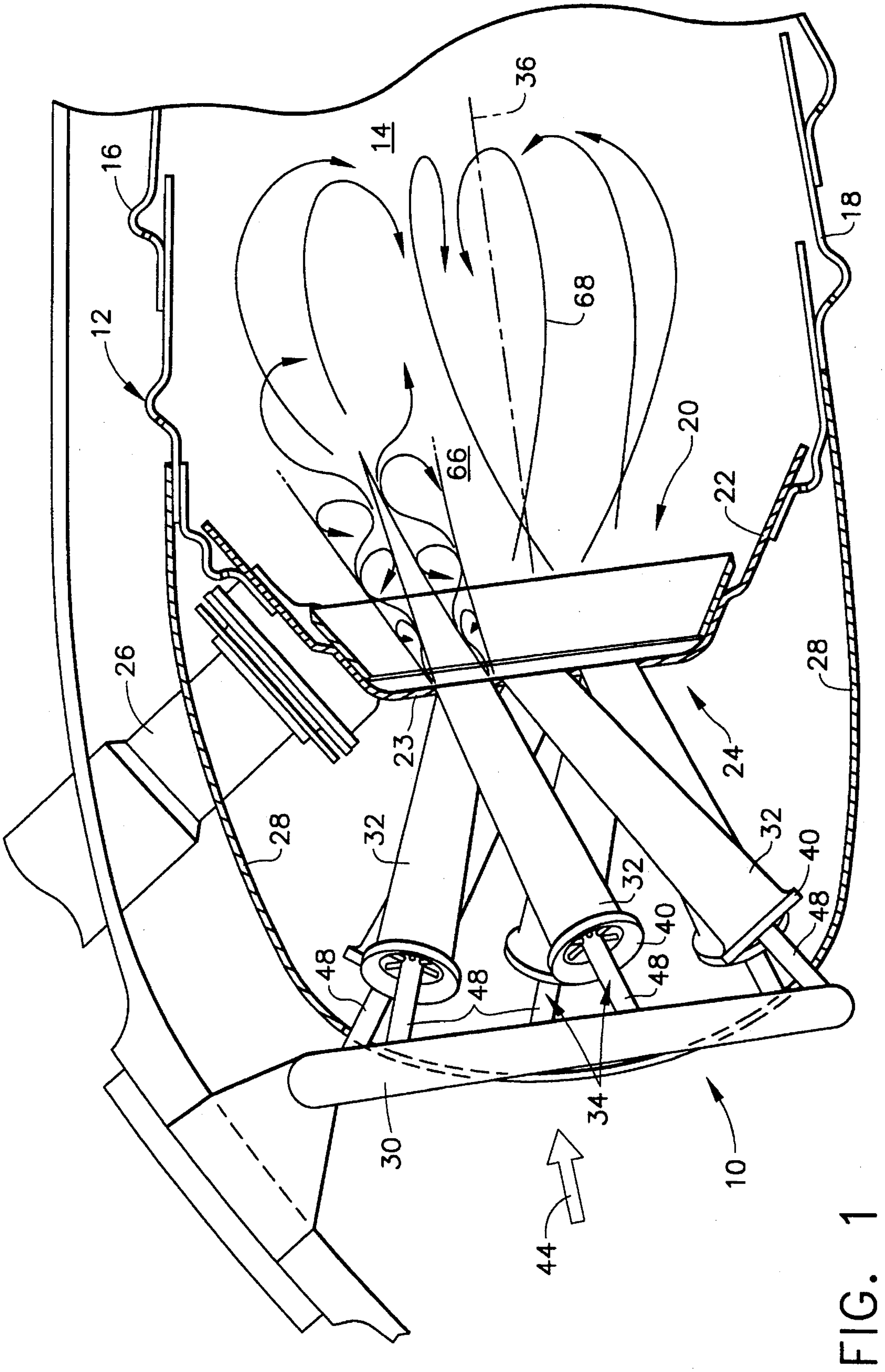
FIG. 1 is a cross-sectional view through a single annular combustor structure including the air fuel mixer of the present invention.

Referring now to the drawings in detail, wherein identical numerals indicate the same elements throughout the figures, FIG. 1 depicts a continuous-burning combustion apparatus 10 of the type suitable for use in a gas turbine engine and comprising a hollow body 12 defining a combustion chamber 14 therein. Hollow body 12 is generally annular in form and is comprised of an outer liner 16, an inner liner 18, and a domed end or dome 20. It should be understood, however, that this invention is not limited to such an annular configuration and may well be employed with equal effectiveness in combustion apparatus of the well-known cylindrical can or cannular type, as well as combustors having a plurality of annuli. In the present annular configuration, the domed end 20 of hollow body 12 includes a spectacle plate 22, having disposed therewith a mixer 24 of the present invention to allow the uniform mixing of fuel and air and the subsequent introduction of the fuel/air mixture into combustion chamber 14 with the minimal formation of pollutants caused by the combustion thereof. It will also be seen in FIG. 1 that combustor 10 includes an igniter 26 and a cowl 28 which is attached to the upstream ends of inner and outer liners 18 and 16, respectively. A fuel manifold 30 is also provided for supplying fuel to air fuel mixer 24, which is in fluid communication with a fuel supply and control means (not shown).

Figure 2:
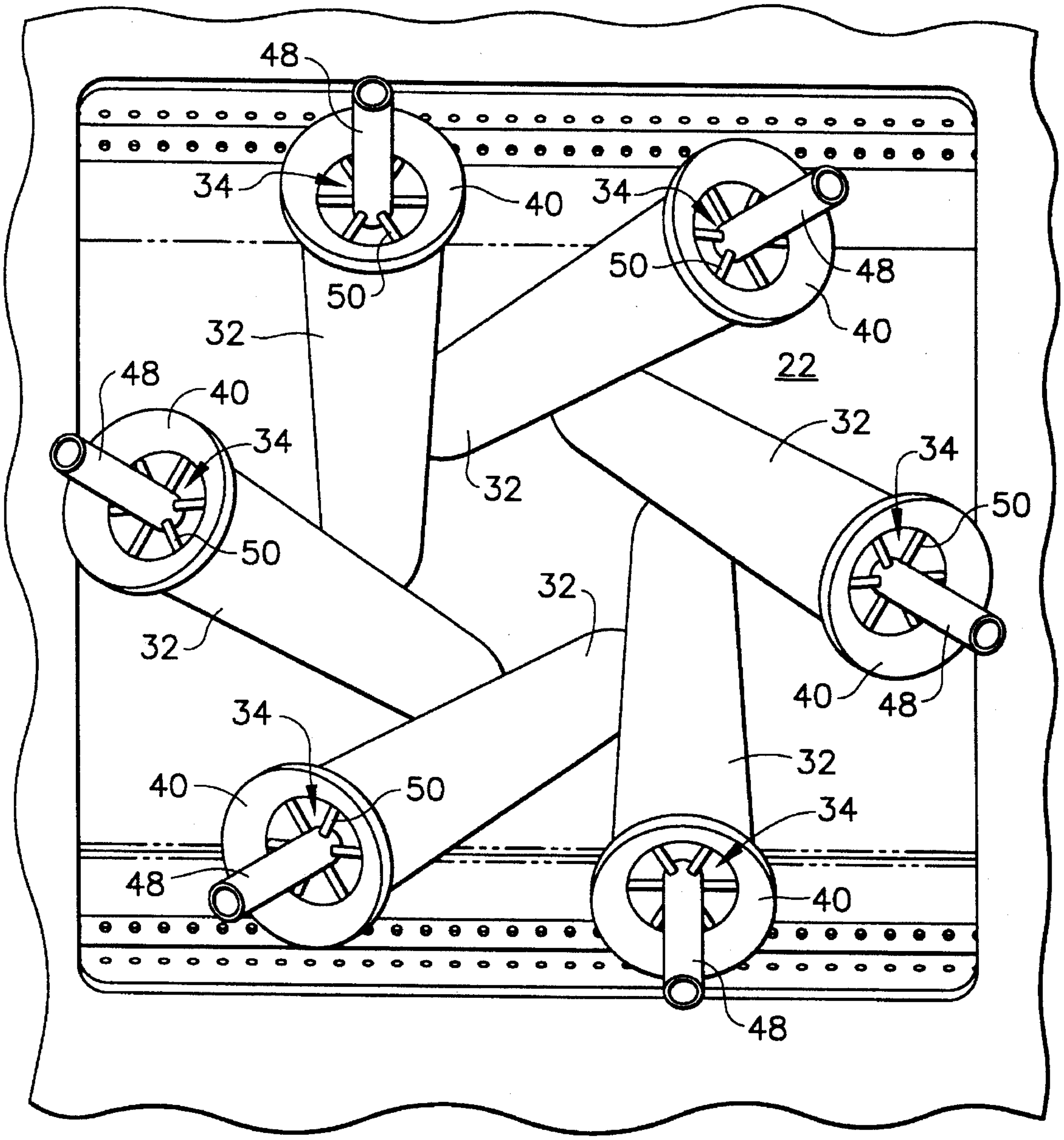
FIG. 2 is a partial, forward looking aft view of the air fuel mixer of the present invention and combustor dome portion of FIG. 1.

More specifically, air fuel mixer 24 includes a plurality of mixing tubes 32 as best seen in FIGS. 1 and 2. Fuel is injected into each mixing tube 32 by a fuel injector 34 which is in fluid communication with fuel manifold 30. While the specific design of fuel injectors 34 is not crucial to the present invention, the preferred embodiments will be described in greater detail hereinafter.

Figure 3:
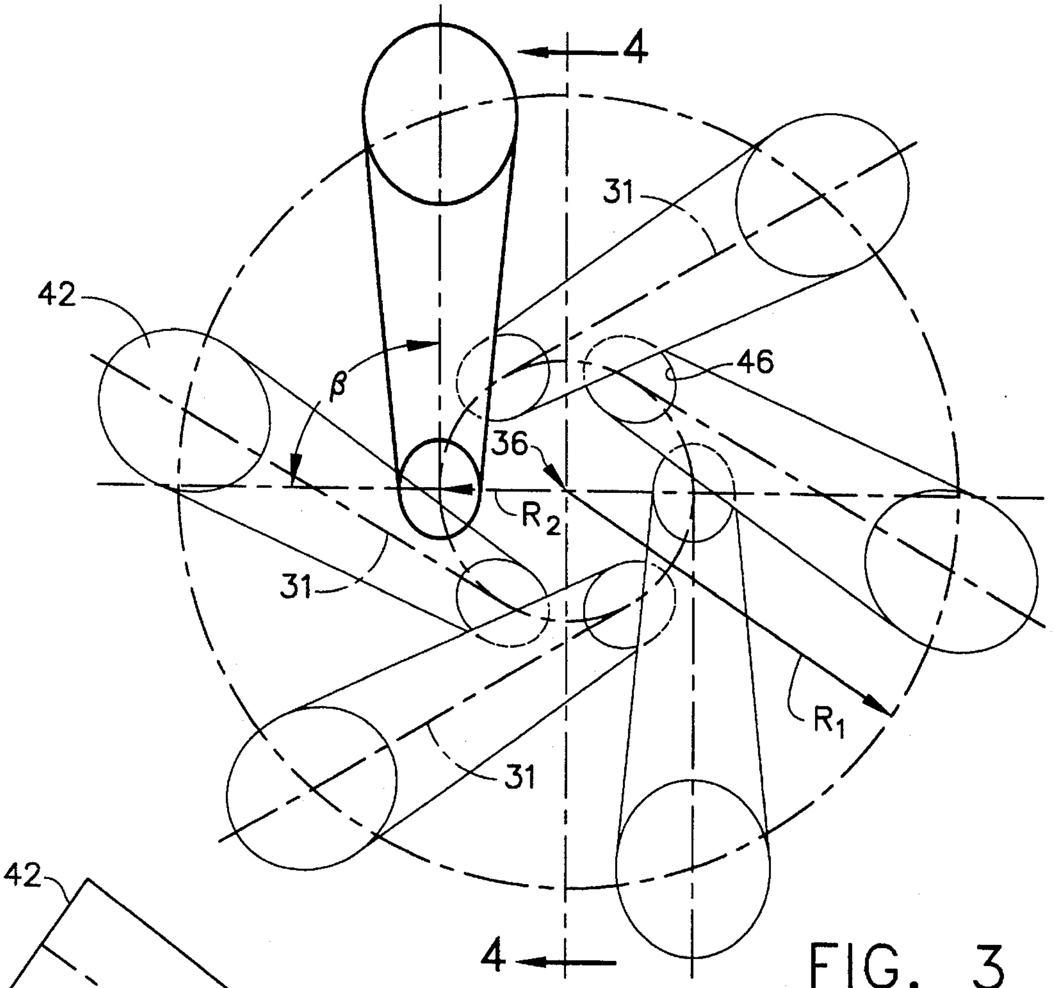
FIG. 3 is a schematic, forward looking aft view of the orientation of the mixing tubes.
Figure 4:
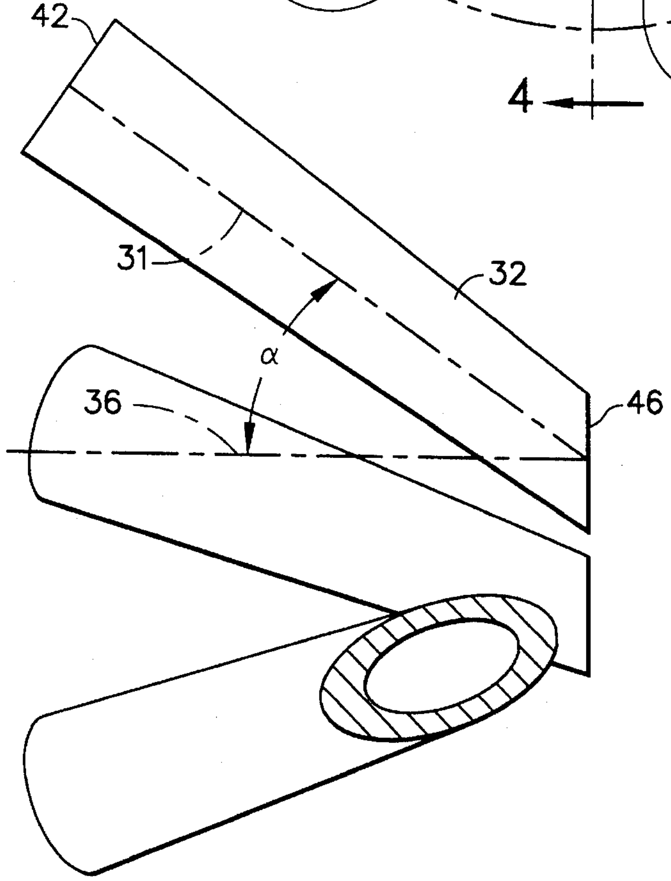
FIG. 4 is a schematic, partial side view of the mixing tubes depicted in FIG. 3.

As best seen in the schematic diagrams of FIGS. 3 and 4, it is preferred that each mixing tube 32 have a longitudinal axis 31 which is oriented at an axial angle a to a centerline axis 36 of the mixer 24, as well as at a radial angle β to centerline axis 36. Preferably, the axial angle o and the radial angle β are within a range of 20°–160°. Collectively, mixing tubes 32 and their longitudinal axes 31 preferably form a truncated cone about centerline axis 36. Due to the orientation of mixing tubes 32, a swirl is imparted to the fuel/air mixture exiting mixing tubes 32 as it enters combustion chamber 14. Further, it will be seen from FIG. 3 that the forward ends 42 of mixing tubes 32 lie approximately on a circle of radius $R_1$, while the extends 46 of mixing tubes 32 lie approximately on a circle of radius $R_2$. Due to the angular orientation of exit ends 46 of mixing tubes 32 with respect to longitudinal axis 31, the exit ends 46 are able to lie in the same radial plane at the upstream portion 23 of spectacle plate 22, whereby spectacle plate 22 is relatively flat. However, it is not required that exit ends 46 lie in the same radial plane provided appropriate modification is made of spectacle plate upstream portion 23. It is also preferred that longitudinal axes 31 of mixing tubes 32 lie on the surface of a hyperboloid of revolution.

Figure 5:
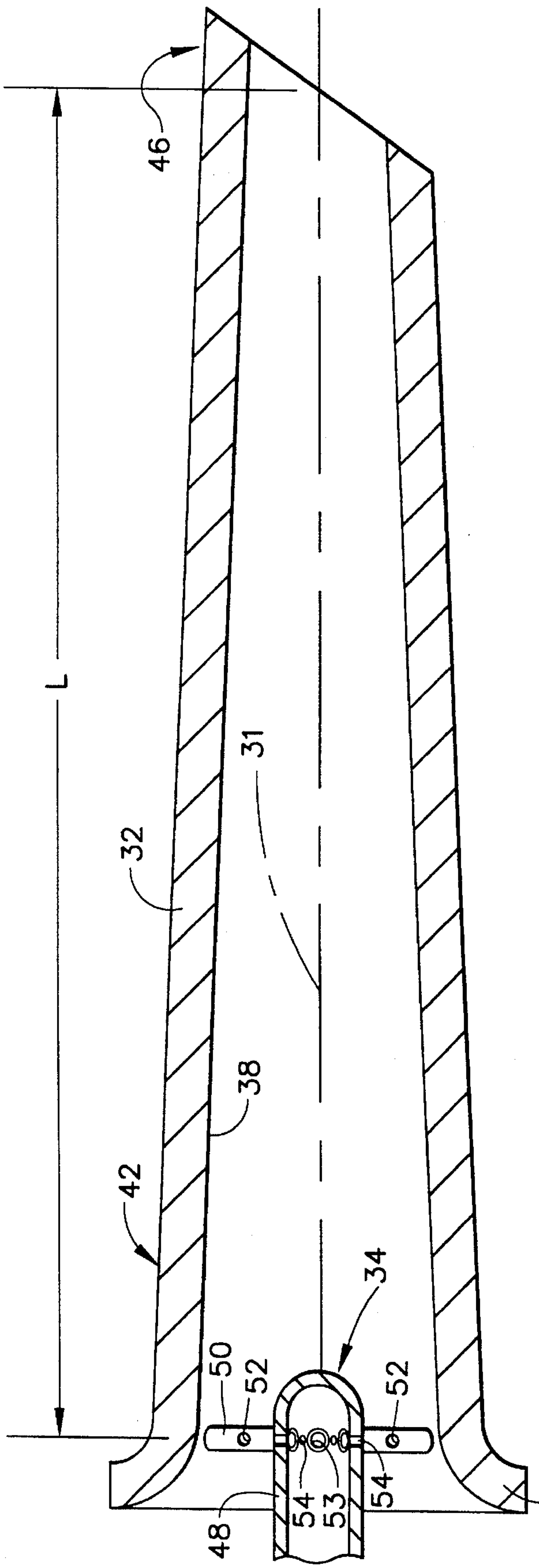
FIG. 5 is an enlarged, cross-sectional view of a mixing tube depicted in FIGS. 1 and 2.

With respect to the specific configuration of mixing tubes 32, it is seen in FIG. 5 that each mixing tube 32 is substantially cylindrical, although it may be conical to ensure that boundary layers do not grow on the interior surface 38 thereof. It will also be seen that mixing tubes 32 include a collar 40 at their front end 42 in order to better receive compressed air 44 from the compressor (not shown). Mixing tubes 32 are sized to have a length L enabling the fuel and air to mix substantially uniformally therein before exiting therefrom. However, mixing tubes 32 are relatively short (approximately 1–3 inches), and the velocity of the air flowing therethrough relatively fast (approximately 300–500 feet per second), and as a consequence there are no recirculation zones in mixing tubes 32 and the residence times for fuel in mixing tubes 32 are severely limited in order to avoid flashback and auto-ignition therein.

Figure 6:
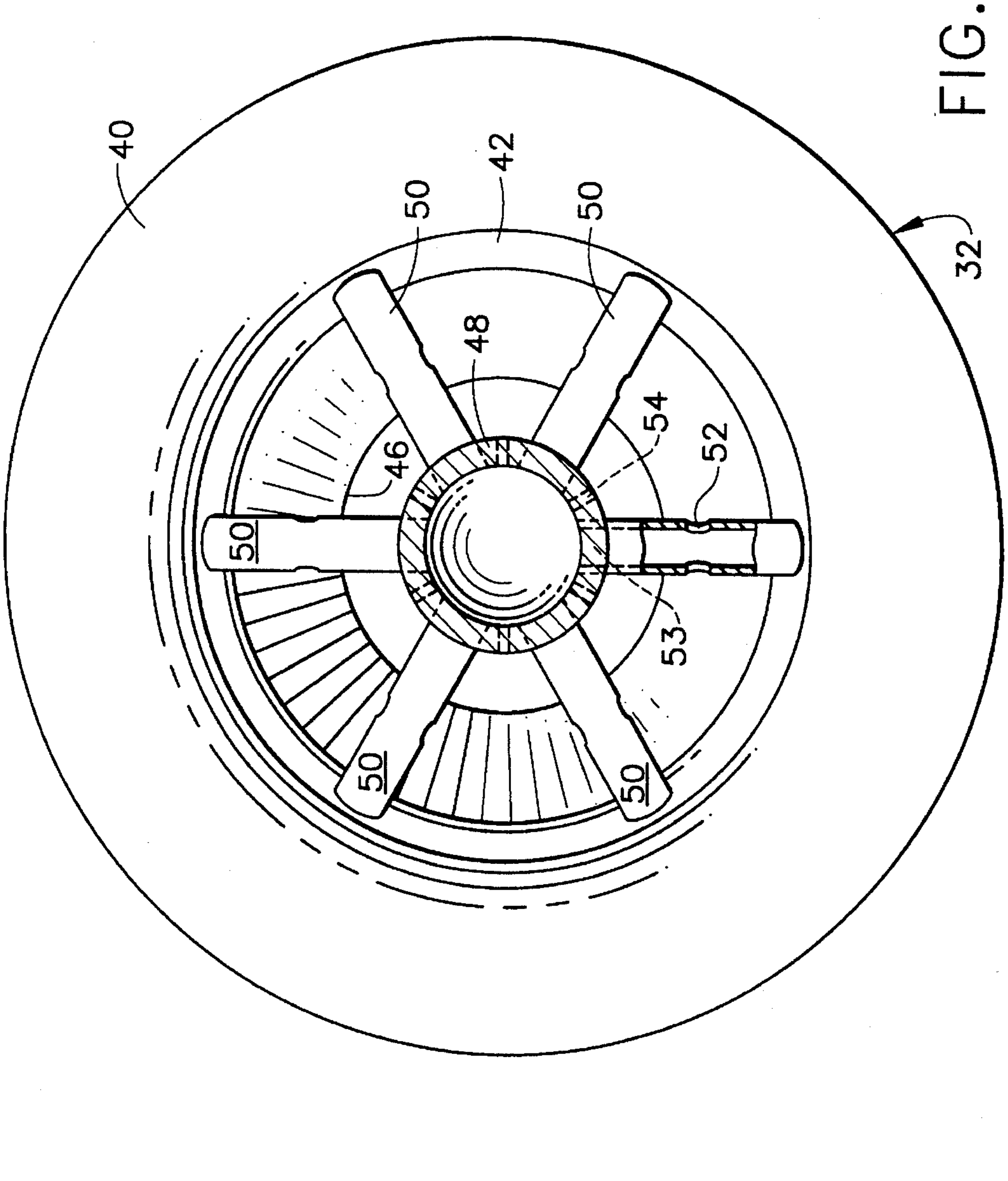
FIG. 6 is an enlarged, forward looking aft view of a mixing tube depicted in FIG. 5.

As stated previously, the manner of injecting fuel into mixing tubes 32 is not crucial to the present invention. Nevertheless, FIGS. 2, 5 and 6 depict fuel injectors 34 as including a cylindrical tube 48 in fluid communication with fuel manifold 30 with a plurality of spokes 50 extending radially therefrom (see FIGS. 2, 5 and 6). Radial spokes 50 have openings 52 therein, which preferably are substantially transverse to the flow of compressed air in mixing tube 32. It will be understood that there is a plurality of fuel passages 53 in cylindrical tubes 48 allowing flow communication of fuel from cylindrical tube 48 to radial spokes 50 (see FIG. 6). Openings 54 are also preferably provided in cylindrical tubes 48 (see FIG. 5 ) which allow fuel to flow directly into mixing tube 32. Accordingly, the shear energy between the fuel and compressed air is maximized within mixing tubes 32, thereby enhancing mixing.

Figure 8:
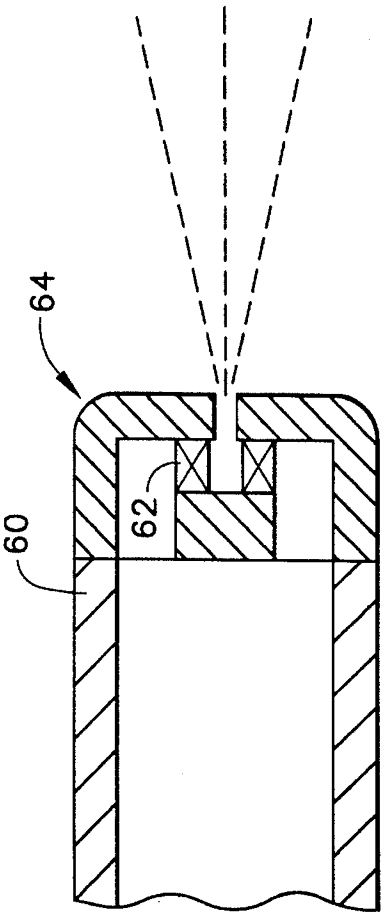
FIG. 8 is a partial, cross-sectional view of a mixing tube having yet another alternative design.
Figure 7:
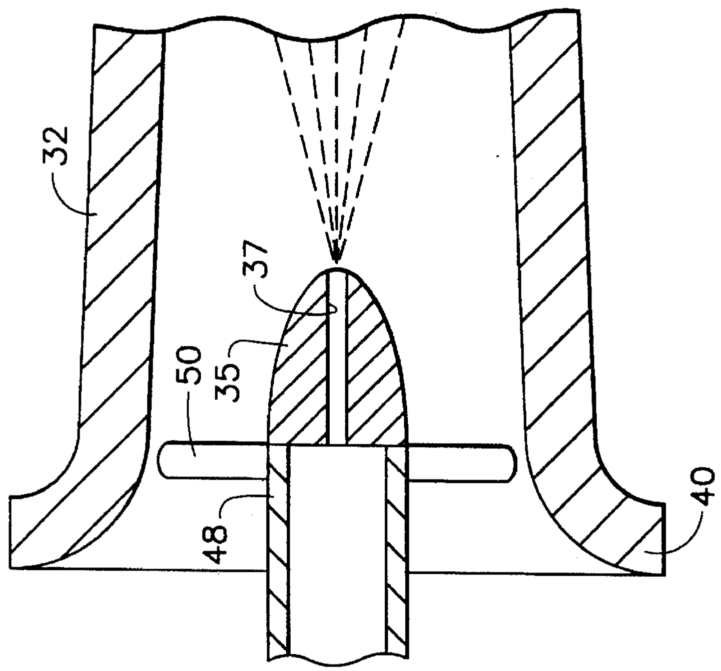
FIG. 7 is a partial, cross-sectional view of a mixing tube having an alternative design.

An alternative design for fuel injection is depicted in FIG. 7, where fuel injector 34 is similar to that depicted in FIGS. 2, 5 and 6 but includes a downstream portion 35 having a passage 37 therethrough which is downstream of radial spokes 50. FIG. 8 depicts another alternative fuel injector 60 which includes an atomizer 62 at its downstream end 64.

In operation, compressed air 44 from a compressor (not shown) is injected into the upstream end 42 of mixing tubes 32 where it passes therethrough and mixes with fuel entering mixing tubes 32 from fuel injectors 34. After the fuel and compressed air have mixed inside mixing tubes 32, the resulting fuel/air mixture is exhausted into a primary combustion region 66 of combustion chamber 14 which is bounded by inner and outer liners 18 and 16. The orientation of mixing tubes 32 to the centerline 36 of combustor 10 imparts a swirl thereto, which is useful in forming a flame recirculation zone 68 in combustion chamber 14.

Figure 9:
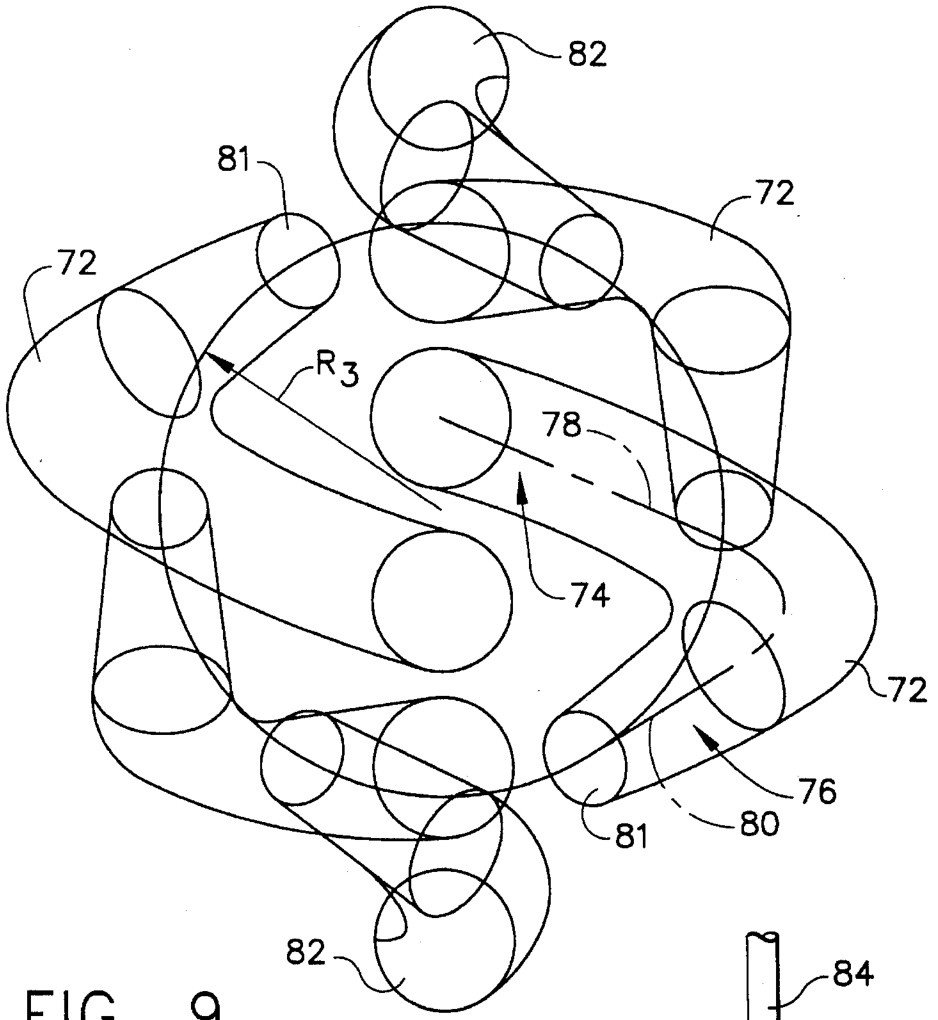
FIG. 9 is a schematic, forward looking aft view of an alternative design and arrangement of the mixing tubes.
Figure 10:
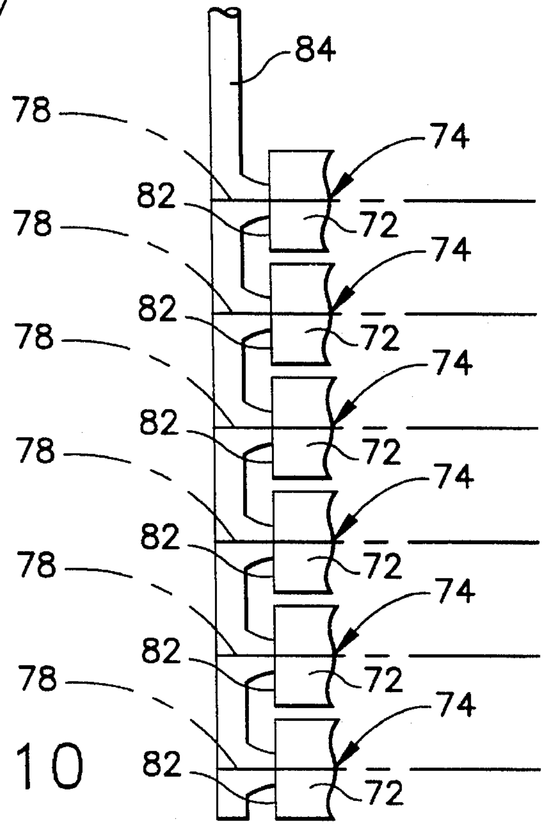
FIG. 10 is a schematic, partial side view of the mixing tube arrangement depicted in FIG. 9.

An alternative design and arrangement of mixing tubes to that depicted in FIGS. 1–6 is shown in FIGS. 9 and 10. There, a plurality of non-linear mixing tubes 72 are depicted, where each mixing tube 72 has a front portion 74 and an exit portion 76. It will be seen that front portion 74 and exit portion 76 each has a longitudinal axis 78 and 80 therethrough, respectively. In particular, it will be noted that longitudinal axis 80 through exit portion 76 is oriented substantially like longitudinal axis 31 in FIGS. 3–5, whereby it is also at an axial angle and a radial angle to centerline axis 36 (preferable within a range of 20°–160°). Thus, the exit ends 81 of tubes 72, which may lie substantially in the same radial plane and be oriented in a circle with respect to each other of radius $R_3$, impart a net swirl to the fuel/air mixture flowing therethrough. This is because exit portions 76 and longitudinal axes 80 of mixing tubes 72 preferably form a truncated cone or lie on the surface of a hyperboloid of revolution.

Due to the non-linear design of mixing tubes 72, the forward ends 82 thereof are preferably oriented substantially in a radial line. This orientation would accommodate the use of a linear fuel nozzle assembly 84, as shown in FIG. 10. In accordance with this non-linear design of mixing tubes 72, it will be understood that front portion 74 and exit portion 76 are preferably at an angle substantially equivalent to 90° minus the axial angle α angle described above, as longitudinal axis 78 is substantially parallel to mixer centerline 36 and longitudinal axis 80 is substantially parallel to longitudinal axis 31.

Having shown and described the preferred embodiment of the present invention, further adaptations of the mixer for providing uniform mixing of fuel and air can be accomplished by appropriate modifications by one of ordinary skilled in the art without departing from the scope of the invention.

What is claimed is:

1. An annular combustor for a gas turbine engine having a centerline axis, comprising:

(a) an annular, radially inner liner having an upstream end and a downstream end;

(b) an annular, radially outer liner having an upstream end and a downstream end, said outer liner being spaced outwardly of said inner liner;

(c) an annular dome joined to said upstream ends of said inner and outer liners, wherein a combustion chamber is defined between said inner liner, said outer liner, and said dome;

(d) a plurality of circumferentially spaced mixers for premixing fuel and air so that an air/fuel mixture is provided to said combustion chamber, each of said mixers having a centerline axis substantially parallel to said combustor centerline axis and further comprising a plurality of mixing tubes, wherein each mixing tube has an upstream end, a downstream end, and a longitudinal axis therebetween, said mixing tubes of each mixer being oriented so that said longitudinal axes converge and are skewed with respect to said respective mixer centerline axis; and (e) means for injecting fuel into said upstream ends of said mixing tubes for each said mixer.

2. The combustor of claim 1, wherein each of said mixing tubes includes a collar at said upstream end thereof to enhance air flow into said mixing tubes.

3. The combustor of claim 1, wherein each of said mixing tubes is cylindrical in shape.

4. The combustor of claim 1, wherein each of said mixing tubes is conical in shape.

5. The combustor of claim 1, wherein each said mixing tube has a length from said upstream end to said downstream end sufficient to mix the fuel and air therein.

6. The combustor of claim 1, wherein said mixing tubes are oriented with respect to each other so as to impart a net swirl to the fuel/air mixture, whereby a recirculation zone is generated in said combustor.

7. The combustor of claim 1, wherein said fuel injection means injects fuel into each upstream end of said mixing tubes substantially perpendicular to said longitudinal axis thereof.

8. The combustor of claim 7, wherein said fuel injection means includes:

(a) a plurality of fuel injection tubes in fluid communication with a fuel supply; and (b) a set of spokes in fluid communication with each of said fuel injection tubes extending radially therefrom and being positioned within each of said mixing tubes, said radial spokes having openings therein oriented substantially transverse to said longitudinal axis of said mixing tube;

wherein fuel is injected into said mixing tubes from said radial spokes.

9. The combustor of claim 8, further including a portion of said fuel injection tubes downstream of said radial spokes, said fuel injection tube downstream portions having a passage therethrough for the injection of fuel into each of said mixing tubes.

10. The combustor of claim 1, wherein said fuel injection means includes:

(a) a plurality of fuel injection tubes having an upstream end and a downstream end, wherein said fuel injection tube upstream end is in fluid communication with a fuel supply; and (b) an atomizer at said downstream end of each fuel injection tube;

wherein fuel is injected into said mixing tubes therefrom.

11. The combustor of claim 1, wherein the downstream ends of said mixing tubes lie substantially in the same radial plane.

12. The combustor of claim 1, wherein the downstream ends of said mixing tubes are at an angle to said longitudinal axes.

13. The combustor of claim 1, wherein said mixing tube upstream ends of each said mixer lie substantially in the same plane.

14. The combustor of claim 13, wherein said mixing tube upstream ends of each said mixer are oriented substantially in a circle in said plane.

15. The combustor of claim 13, wherein said mixing tube upstream ends are oriented substantially in a line in said plane.

16. The combustor of claim 1, wherein said mixing tubes of each said mixer are linear.

17. The combustor of claim 1, wherein said mixing tubes of each said mixer are non-linear.

18. The combustor of claim 17, wherein said longitudinal axis of each said mixing tube is non-linear.

19. The combustor of claim 1, wherein said mixing tube downstream ends of each said mixer lie substantially in the same plane.

20. The combustor of claim 19, wherein said mixing tube downstream ends of each said mixer are oriented substantially in a circle in said plane.

21. An annular combustor for a gas turbine engine having a centerline axis, comprising:

(a) an annular, radially inner liner having an upstream end and a downstream end;

(b) an annular, radially outer liner having an upstream end and a downstream end, said outer liner being spaced outwardly of said inner liner;

(c) an annular dome joined to said upstream ends of said inner and outer liners, wherein a combustion chamber is defined between said inner liner, said outer liner, and said dome;

(d) a plurality of circumferentially spaced mixers for premixing fuel and air so that an air/fuel mixture is provided to said combustion chamber, each of said mixers having a centerline axis substantially parallel to said combustor centerline axis and further comprising a plurality of mixing tubes, wherein each mixing tube has an upstream end, a downstream end, and a longitudinal axis therebetween, said mixing tubes of each mixer being oriented so that said longitudinal axes converge and lie on a hyperboloid of revolution with respect to said respective mixer centerline axis; and (e) means for injecting fuel into said upstream ends of said mixing tubes for each said mixer.

* * * * *